(12) United States Patent
Leijon et al.

(10) Patent No.: US 6,891,303 B2
(45) Date of Patent: *May 10, 2005

(54) HIGH VOLTAGE AC MACHINE WINDING WITH GROUNDED NEUTRAL CIRCUIT

(75) Inventors: Mats Leijon, Västerås (SE); Bertil Berggren, Västerås (SE); Lars Gertmar, Västerås (SE); Jan-Anders Nygren, Västerås (SE); Erland Sörensen, Västerås (SE)

(73) Assignee: ABB AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 42 days.

This patent is subject to a terminal disclaimer.

(21) Appl. No.: 08/973,305
(22) PCT Filed: May 27, 1997
(86) PCT No.: PCT/SE97/00891
§ 371 (c)(1),
(2), (4) Date: Apr. 9, 1998
(87) PCT Pub. No.: WO97/45926
PCT Pub. Date: Dec. 4, 1997

(65) Prior Publication Data
US 2002/0047439 A1 Apr. 25, 2002

(30) Foreign Application Priority Data
May 29, 1996 (SE) ................................ 9602078
May 29, 1996 (SE) ................................ 9602079
Feb. 3, 1997 (SE) ................................ 9700335
Feb. 3, 1997 (SE) ................................ 9700347

(51) Int. Cl.$^7$ ............................. H02K 3/40; H02K 3/12
(52) U.S. Cl. .................. 310/196; 310/179; 310/180; 310/208; 174/DIG. 14; 174/DIG. 20; 174/DIG. 28
(58) Field of Search ................................ 310/179–180, 310/184, 195–196, 198–208, 213; 174/DIG. 13–33; 290/1 R

(56) References Cited

U.S. PATENT DOCUMENTS

| 681,800 A | 9/1901 | Lasche |
| 847,008 A | 3/1907 | Kitsee |
| 1,304,451 A | 5/1919 | Burnham |

(Continued)

FOREIGN PATENT DOCUMENTS

| AT | 399790 | 7/1995 |
| BE | 565063 | 2/1957 |
| CH | 391071 | 4/1965 |

(Continued)

OTHER PUBLICATIONS

Shipboard Electrical Insulation; G. L. Moses. 1951, pp2&3.
ABB Eikrafthandbok: ABB AB; 1988 ; pp274–276.
Eikraft teknisk Handbok. 2 Elmaskiner; A. Alfredsson et al: 1988. pp 121–123.

(Continued)

*Primary Examiner*—Burton Mullins
(74) *Attorney, Agent, or Firm*—Dykema Gossett PLLC

(57) ABSTRACT

An electric high voltage AC machine intended to be directly connected to a distribution or transmission network (16) comprises at least one winding. This winding comprises at least one current-carrying conductor, a first layer having semiconducting properties provided around said conductor, a solid insulating layer provided around said first layer, and a second layer having semiconducting properties provided around said insulating layer. In addition grounding means (18, 24, 26, 28) are provided to connect at least one point of said winding to ground.

41 Claims, 5 Drawing Sheets

U.S. PATENT DOCUMENTS

Figure 1:
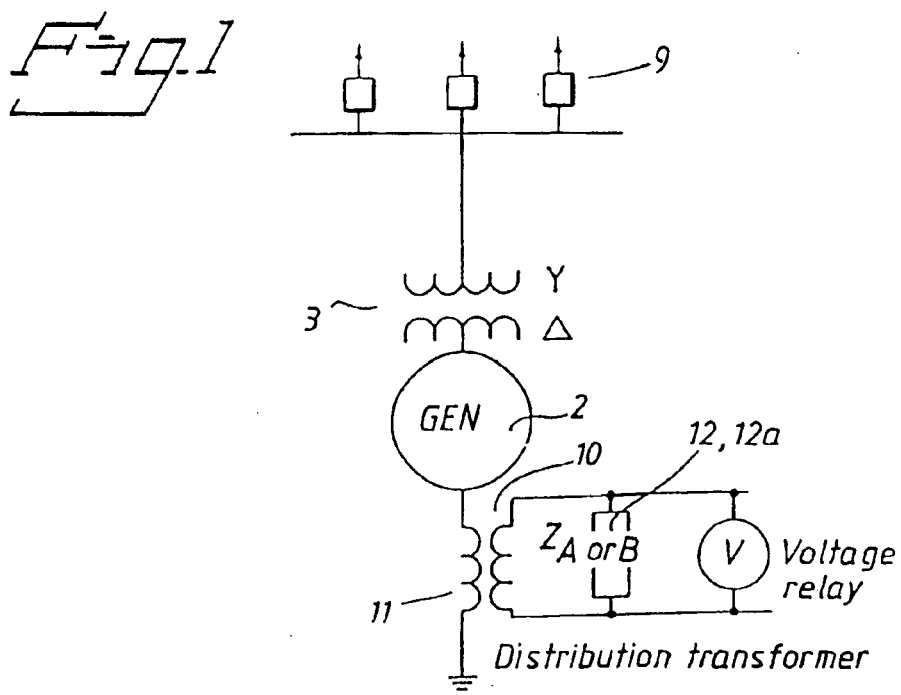

| | | |
|---|---|---|
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,952,679 A | 11/1960 | Stratton |
| 2,959,699 A | 11/1960 | Smith et al. |
| 2,975,309 A | 3/1961 | Seidner |
| 3,014,139 A * | 12/1961 | Shildneck .................... 310/66 |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Gcetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |

| | | | | | |
|---|---|---|---|---|---|
| 4,238,339 A | 12/1980 | Khutoretsky et al. | 4,594,630 A | 6/1986 | Rabinowitz et al. |
| 4,239,999 A | 12/1980 | Vinokurov et al. | 4,607,183 A | 8/1986 | Rieber et al. |
| 4,245,182 A | 1/1981 | Aotsu et al. | 4,615,109 A | 10/1986 | Wcislo et al. |
| 4,246,694 A | 1/1981 | Raschbichler et al. | 4,615,778 A | 10/1986 | Elton |
| 4,255,684 A | 3/1981 | Mischler et al. | 4,618,795 A | 10/1986 | Cooper et al. |
| 4,258,280 A | 3/1981 | Starcevic | 4,619,040 A | 10/1986 | Wang et al. |
| 4,262,209 A * | 4/1981 | Berner .................. 290/7 | 4,622,116 A | 11/1986 | Elton et al. |
| 4,274,027 A | 6/1981 | Higuchi et al. | 4,633,109 A | 12/1986 | Feigel |
| 4,281,264 A | 7/1981 | Keim et al. | 4,650,924 A | 3/1987 | Kauffman et al. |
| 4,292,558 A | 9/1981 | Flick et al. | 4,652,963 A | 3/1987 | Fahlen |
| 4,307,311 A | 12/1981 | Grozinger | 4,654,551 A * | 3/1987 | Farr .................. 310/112 |
| 4,308,476 A | 12/1981 | Schuler | 4,656,316 A | 4/1987 | Meltsch |
| 4,308,575 A | 12/1981 | Mase | 4,656,379 A * | 4/1987 | McCarty .................. 310/181 |
| 4,310,966 A | 1/1982 | Breitenbach | 4,677,328 A | 6/1987 | Kumakura |
| 4,314,168 A | 2/1982 | Breitenbach | 4,687,882 A | 8/1987 | Stone et al. |
| 4,317,001 A | 2/1982 | Silver et al. | 4,692,731 A | 9/1987 | Osinga |
| 4,320,645 A | 3/1982 | Stanley | 4,723,083 A | 2/1988 | Elton |
| 4,321,426 A | 3/1982 | Schaeffer | 4,723,104 A | 2/1988 | Rohatyn |
| 4,321,518 A | 3/1982 | Akamatsu | 4,724,345 A | 2/1988 | Elton et al. |
| 4,330,726 A * | 5/1982 | Albright et al. .......... 310/254 | 4,732,412 A | 3/1988 | van der Linden et al. |
| 4,337,922 A | 7/1982 | Streiff et al. | 4,737,704 A | 4/1988 | Kalinnikov et al. |
| 4,341,989 A | 7/1982 | Sandberg et al. | 4,745,314 A | 5/1988 | Nakano |
| 4,347,449 A | 8/1982 | Beau | 4,761,602 A | 8/1988 | Leibovich |
| 4,347,454 A | 8/1982 | Gellert et al. | 4,766,365 A | 8/1988 | Bolduc et al. |
| 4,353,612 A | 10/1982 | Meyers | 4,771,168 A | 9/1988 | Gundersen et al. |
| 4,357,542 A | 11/1982 | Kirschbaum | 4,785,138 A | 11/1988 | Brietenbach et al. |
| 4,360,748 A | 11/1982 | Raschbichler et al. | 4,795,933 A | 1/1989 | Sakai |
| 4,361,723 A | 11/1982 | Hvizd, Jr. et al. | 4,827,172 A | 5/1989 | Kobayashi |
| 4,365,178 A | 12/1982 | Lexz | 4,845,308 A | 7/1989 | Womack, Jr. et al. |
| 4,367,425 A | 1/1983 | Mendelsohn et al. | 4,847,747 A | 7/1989 | Abbondanti |
| 4,367,890 A | 1/1983 | Spirk | 4,853,565 A * | 8/1989 | Elton et al. .................. 310/45 |
| 4,368,418 A | 1/1983 | Demello et al. | 4,859,810 A | 8/1989 | Cloetens et al. |
| 4,369,389 A | 1/1983 | Lambrecht | 4,859,989 A | 8/1989 | McPherson |
| 4,371,745 A | 2/1983 | Sakashita | 4,860,430 A | 8/1989 | Raschbichler et al. |
| 4,384,944 A | 5/1983 | Silver et al. | 4,864,266 A | 9/1989 | Feather et al. |
| 4,387,316 A | 6/1983 | Katsekas | 4,883,230 A | 11/1989 | Lindstrom |
| 4,401,920 A | 8/1983 | Taylor et al. | 4,890,040 A | 12/1989 | Gundersen |
| 4,403,163 A | 9/1983 | Armerding et al. | 4,894,284 A | 1/1990 | Yamanouchi et al. |
| 4,404,486 A | 9/1983 | Keim et al. | 4,914,386 A | 4/1990 | Zocholl |
| 4,411,710 A | 10/1983 | Mochizuki et al. | 4,918,347 A | 4/1990 | Takaba |
| 4,421,284 A | 12/1983 | Pan | 4,918,835 A | 4/1990 | Weislo |
| 4,425,521 A | 1/1984 | Rosenberry, Jr. et al. | 4,924,342 A | 5/1990 | Lee |
| 4,426,771 A | 1/1984 | Wang et al. | 4,926,079 A | 5/1990 | Niemela et al. |
| 4,429,244 A | 1/1984 | Nikiten et al. | 4,942,326 A | 7/1990 | Butler, III et al. |
| 4,431,960 A | 2/1984 | Zucker | 4,949,001 A * | 8/1990 | Campbell .................. 310/220 |
| 4,432,029 A | 2/1984 | Lundqvist | 4,982,147 A * | 1/1991 | Lauw .................. 318/729 |
| 4,437,464 A | 3/1984 | Crow | 4,994,952 A | 2/1991 | Silva et al. |
| 4,443,725 A | 4/1984 | Derderian et al. | 4,997,995 A | 3/1991 | Simmons et al. |
| 4,470,884 A | 9/1984 | Carr | 5,012,125 A | 4/1991 | Conway |
| 4,473,765 A | 9/1984 | Butman, Jr. et al. | 5,030,813 A | 7/1991 | Stanisz |
| 4,475,075 A | 10/1984 | Munn | 5,036,165 A * | 7/1991 | Elton et al. .................. 174/102 |
| 4,477,690 A | 10/1984 | Nikitin et al. | 5,036,238 A | 7/1991 | Tajima |
| 4,481,438 A | 11/1984 | Keim | 5,066,881 A | 11/1991 | Elton et al. |
| 4,484,106 A | 11/1984 | Taylor et al. | 5,067,046 A | 11/1991 | Elton et al. |
| 4,488,079 A | 12/1984 | Dailey et al. | 5,083,360 A | 1/1992 | Valencic et al. |
| 4,490,651 A | 12/1984 | Taylor et al. | 5,086,246 A | 2/1992 | Dymond et al. |
| 4,503,284 A | 3/1985 | Minnick et al. | 5,091,609 A | 2/1992 | Swada et al. |
| 4,508,251 A | 4/1985 | Harada et al. | 5,094,703 A * | 3/1992 | Takaoka et al. .......... 148/269 |
| 4,510,077 A | 4/1985 | Elton | 5,095,175 A | 3/1992 | Yoshida et al. |
| 4,517,471 A | 5/1985 | Sachs | 5,097,241 A | 3/1992 | Smith et al. |
| 4,520,287 A | 5/1985 | Wang et al. | 5,097,591 A | 3/1992 | Wcislo et al. |
| 4,523,249 A | 6/1985 | Arimoto | 5,111,095 A | 5/1992 | Hendershot |
| 4,538,131 A | 8/1985 | Baier et al. | 5,124,607 A | 6/1992 | Rieber et al. |
| 4,546,210 A | 10/1985 | Akiba et al. | 5,136,459 A | 8/1992 | Fararooy |
| 4,551,780 A | 11/1985 | Canay | 5,140,290 A | 8/1992 | Dersch |
| 4,557,038 A | 12/1985 | Wcislo et al. | 5,153,460 A | 10/1992 | Bovino et al. |
| 4,560,896 A | 12/1985 | Vogt et al. | 5,168,662 A | 12/1992 | Nakamura et al. |
| 4,565,929 A | 1/1986 | Baskin et al. | 5,171,941 A | 12/1992 | Shimizu et al. |
| 4,571,453 A | 2/1986 | Takaoka et al. | 5,182,537 A | 1/1993 | Thuis |
| 4,588,916 A | 5/1986 | Lis | 5,187,428 A | 2/1993 | Hutchison et al. |
| 4,590,416 A | 5/1986 | Porche et al. | 5,231,249 A | 7/1993 | Kimura et al. |

| | | | | | |
|---|---|---|---|---|---|
| 5,235,488 A | 8/1993 | Koch | DE | 673545 | 3/1939 |
| 5,246,783 A | 9/1993 | Spenadel et al. | DE | 719009 | 3/1942 |
| 5,264,778 A | 11/1993 | Kimmel et al. | DE | 846583 | 8/1952 |
| 5,287,262 A | 2/1994 | Klein | DE | 875227 | 4/1953 |
| 5,304,883 A | 4/1994 | Denk | DE | 975999 | 1/1963 |
| 5,305,961 A | 4/1994 | Errard et al. | DE | 1465719 | 5/1969 |
| 5,321,308 A | 6/1994 | Johncock | DE | 1807391 | 5/1970 |
| 5,323,330 A | 6/1994 | Asplund et al. | DE | 2050674 | 5/1971 |
| 5,325,008 A | 6/1994 | Grant | DE | 1638176 | 6/1971 |
| 5,325,259 A | 6/1994 | Paulsson | DE | 2155371 | 5/1973 |
| 5,327,637 A | 7/1994 | Britenbach et al. | DE | 2400698 | 7/1975 |
| 5,341,281 A | 8/1994 | Skibinski | DE | 2520511 | 11/1976 |
| 5,343,139 A | 8/1994 | Gyugyi et al. | DE | 2656389 | 6/1978 |
| 5,355,046 A | 10/1994 | Weigelt | DE | 2721905 | 11/1978 |
| 5,365,132 A | 11/1994 | Hann et al. | DE | 137164 | 8/1979 |
| 5,387,890 A | 2/1995 | Estop et al. | DE | 138840 | 11/1979 |
| 5,397,513 A | 3/1995 | Steketee, Jr. | DE | 2824951 | 12/1979 |
| 5,399,941 A | 3/1995 | Grothaus et al. | DE | 2835386 | 2/1980 |
| 5,400,005 A | 3/1995 | Bobry | DE | 2839517 | 3/1980 |
| 5,408,169 A | 4/1995 | Jeanneret | DE | 2854520 | 6/1980 |
| 5,449,861 A | 9/1995 | Fujino et al. | DE | 3009102 | 9/1980 |
| 5,452,170 A | 9/1995 | Ohde et al. | DE | 2913697 | 10/1980 |
| 5,468,916 A | 11/1995 | Litenas et al. | DE | 2920478 | 12/1980 |
| 5,499,178 A | 3/1996 | Mohan | DE | 3028777 | 3/1981 |
| 5,500,632 A | 3/1996 | Halser, III | DE | 2939004 | 4/1981 |
| 5,510,942 A | 4/1996 | Bock et al. | DE | 3006382 | 8/1981 |
| 5,530,307 A | 6/1996 | Horst | DE | 3008818 | 9/1981 |
| 5,533,658 A | 7/1996 | Benedict et al. | DE | 209313 | 4/1984 |
| 5,534,754 A | 7/1996 | Poumey | DE | 3305225 | 8/1984 |
| 5,545,853 A | 8/1996 | Hildreth | DE | 3309051 | 9/1984 |
| 5,550,410 A * | 8/1996 | Titus ............................ 290/52 | DE | 3441311 | 5/1986 |
| 5,583,387 A | 12/1996 | Takeuchi et al. | DE | 3543106 | 6/1987 |
| 5,587,126 A | 12/1996 | Steketee, Jr. | DE | 2917717 | 8/1987 |
| 5,598,137 A | 1/1997 | Alber et al. | DE | 3612112 | 10/1987 |
| 5,607,320 A | 3/1997 | Wright | DE | 3726346 | 2/1989 |
| 5,612,510 A | 3/1997 | Hildreth | DE | 3925337 | 2/1991 |
| 5,663,605 A * | 9/1997 | Evans et al. ................ 310/181 | DE | 4023903 | 11/1991 |
| 5,672,926 A * | 9/1997 | Brandes et al. ............. 310/181 | DE | 4022476 | 1/1992 |
| 5,689,223 A | 11/1997 | Demarmels et al. | DE | 4233558 | 3/1994 |
| 5,807,447 A | 9/1998 | Forrest | DE | 4402184 | 8/1995 |
| 5,834,699 A | 11/1998 | Buck et al. | DE | 4409794 | 8/1995 |
| | | | DE | 4412761 | 10/1995 |
| | FOREIGN PATENT DOCUMENTS | | DE | 4420322 | 12/1995 |
| | | | DE | 19620906 | 1/1996 |
| CH | 534448 | 2/1973 | DE | 4438186 | 5/1996 |
| CH | 539328 | 7/1973 | DE | 19020222 | 3/1997 |
| CH | 657482 | 8/1986 | DE | 19547229 | 6/1997 |
| DE | 40414 | 8/1887 | DE | 468827 | 7/1997 |
| DE | 277012 | 7/1914 | DE | 134022 | 12/2001 |
| DE | 336418 | 6/1920 | EP | 049104 | 4/1982 |
| DE | 372390 | 3/1923 | EP | 0493704 | 4/1982 |
| DE | 386561 | 12/1923 | EP | 0056580 A1 | 7/1982 |
| DE | 387973 | 1/1924 | EP | 078908 | 5/1983 |
| DE | 406371 | 11/1924 | EP | 0120154 | 10/1984 |
| DE | 425551 | 2/1926 | EP | 0130124 | 1/1985 |
| DE | 426793 | 3/1926 | EP | 0142813 | 5/1985 |
| DE | 432169 | 7/1926 | EP | 0155405 | 9/1985 |
| DE | 433749 | 9/1926 | EP | 0102513 | 1/1986 |
| DE | 435608 | 10/1926 | EP | 0174783 | 3/1986 |
| DE | 435609 | 10/1926 | EP | 0185788 | 7/1986 |
| DE | 441717 | 3/1927 | EP | 0277358 | 8/1986 |
| DE | 443011 | 4/1927 | EP | 0234521 | 9/1987 |
| DE | 460124 | 5/1928 | EP | 0244059 | 11/1987 |
| DE | 482506 | 9/1929 | EP | 0246377 | 11/1987 |
| DE | 501181 | 7/1930 | EP | 0265868 | 5/1988 |
| DE | 523047 | 4/1931 | EP | 0274691 | 7/1988 |
| DE | 568508 | 1/1933 | EP | 0280759 | 9/1988 |
| DE | 572030 | 3/1933 | EP | 0282876 | 9/1988 |
| DE | 584639 | 9/1933 | EP | 0309096 | 3/1989 |
| DE | 586121 | 10/1933 | EP | 0314850 | 5/1989 |
| DE | 604972 | 11/1934 | EP | 0316911 | 5/1989 |
| DE | 629301 | 4/1936 | | | |

| | | | | | |
|---|---|---|---|---|---|
| EP | 0317248 | 5/1989 | GB | 1024583 | 3/1966 |
| EP | 0335430 | 10/1989 | GB | 1053337 | 12/1966 |
| EP | 0342554 | 11/1989 | GB | 1059123 | 2/1967 |
| EP | 0221404 | 5/1990 | GB | 1103098 | 2/1968 |
| EP | 0375101 | 6/1990 | GB | 1103099 | 2/1968 |
| EP | 0406437 | 1/1991 | GB | 1117401 | 6/1968 |
| EP | 0439410 | 7/1991 | GB | 1135242 | 12/1968 |
| EP | 0440865 | 8/1991 | GB | 1147049 | 4/1969 |
| EP | 0469155 A1 | 2/1992 | GB | 1157885 | 7/1969 |
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1319257 | 6/1973 |
| EP | 0620630 | 10/1994 | GB | 1322433 | 7/1973 |
| EP | 0642027 | 3/1995 | GB | 1340983 | 12/1973 |
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0695019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2022327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715225 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854725 | 11/1960 | JP | 6233442 | 2/1993 |
| GB | 870583 | 6/1961 | JP | 6325629 | 5/1993 |
| GB | 913386 | 12/1962 | JP | 7057951 | 8/1993 |
| GB | 965741 | 8/1964 | JP | 7264789 | 3/1994 |
| GB | 992249 | 5/1965 | JP | 8167332 | 12/1994 |

| | | | | | |
|---|---|---|---|---|---|
| JP | 7161270 | 6/1995 | WO | WO9745929 | 12/1997 |
| JP | 8264039 | 11/1995 | WO | WO9745930 | 12/1997 |
| JP | 9200989 | 1/1996 | WO | WO9745931 | 12/1997 |
| JP | 8036952 | 2/1996 | WO | WO9745932 | 12/1997 |
| JP | 8167360 | 6/1996 | WO | WO9745933 | 12/1997 |
| LU | 67199 | 3/1972 | WO | WO9745934 | 12/1997 |
| SE | 90308 | 9/1937 | WO | WO9745935 | 12/1997 |
| SE | 305899 | 11/1968 | WO | WO9745936 | 12/1997 |
| SE | 255156 | 2/1969 | WO | WO9745937 | 12/1997 |
| SE | 341428 | 12/1971 | WO | WO9745938 | 12/1997 |
| SE | 453236 | 1/1982 | WO | WO9745939 | 12/1997 |
| SE | 457792 | 6/1987 | WO | WO9747067 | 12/1997 |
| SE | 502417 | 12/1993 | WO | PCT/FR 98/00468 | 5/1998 |
| SU | 266037 | 10/1965 | WO | WO9820595 | 5/1998 |
| SU | 792302 | 1/1971 | WO | WO9820596 | 5/1998 |
| SU | 425268 | 9/1974 | WO | WO9820597 | 5/1998 |
| SU | 646403 | 2/1979 | WO | WO 98/20598 | 5/1998 |
| SU | 1019553 | 1/1980 | WO | WO9820600 | 5/1998 |
| SU | 694939 | 1/1982 | WO | WO 98/20602 | 5/1998 |
| SU | 955369 | 8/1983 | WO | WO9821385 | 5/1998 |
| SU | 1189322 | 10/1986 | WO | WO9827634 | 6/1998 |
| SU | 1511810 | 5/1987 | WO | WO9827635 | 6/1998 |
| WO | WO8202617 | 8/1982 | WO | WO9827636 | 6/1998 |
| WO | WO8502302 | 5/1985 | WO | WO9829927 | 7/1998 |
| WO | WO9011389 | 10/1990 | WO | WO9829928 | 7/1998 |
| WO | WO9012409 | 10/1990 | WO | WO9829929 | 7/1998 |
| WO | PCT/DE 90/00279 | 11/1990 | WO | WO9829930 | 7/1998 |
| WO | WO9101059 | 1/1991 | WO | WO9829931 | 7/1998 |
| WO | WO9101585 | 2/1991 | WO | WO9829932 | 7/1998 |
| WO | WO9107807 | 3/1991 | WO | WO9833731 | 8/1998 |
| WO | PCT SE 91/00077 | 4/1991 | WO | WO9833736 | 8/1998 |
| WO | WO9109442 | 6/1991 | WO | WO9833737 | 8/1998 |
| WO | WO 91/11841 | 8/1991 | WO | WO9834238 | 8/1998 |
| WO | WO8115862 | 10/1991 | WO | WO 98/34239 | 8/1998 |
| WO | WO 91/15755 | 10/1991 | WO | WO9834240 | 8/1998 |
| WO | WO9201328 | 1/1992 | WO | WO9834241 | 8/1998 |
| WO | WO9203870 | 3/1992 | WO | WO9834242 | 8/1998 |
| WO | WO9321681 | 10/1993 | WO | WO9834243 | 8/1998 |
| WO | WO9406194 | 3/1994 | WO | WO9834244 | 8/1998 |
| WO | WO9518058 | 7/1995 | WO | WO9834245 | 8/1998 |
| WO | WO9522153 | 8/1995 | WO | WO9834246 | 8/1998 |
| WO | WO9524049 | 9/1995 | WO | WO9834247 | 8/1998 |
| WO | WO9622606 | 7/1996 | WO | WO9834248 | 8/1998 |
| WO | WO9622607 | 7/1996 | WO | WO9834249 | 8/1998 |
| WO | PCT /CN 96/00010 | 10/1996 | WO | WO9834250 | 8/1998 |
| WO | WO9630144 | 10/1996 | WO | WO9834309 | 8/1998 |
| WO | WO9710640 | 3/1997 | WO | WO9834312 | 8/1998 |
| WO | WO9711831 | 4/1997 | WO | WO9834315 | 8/1998 |
| WO | WO9716881 | 5/1997 | WO | WO9834321 | 8/1998 |
| WO | WO 97/29494 | 8/1997 | WO | WO9834322 | 8/1998 |
| WO | W045908 | 12/1997 | WO | WO9834323 | 8/1998 |
| WO | WO9745288 | 12/1997 | WO | WO9834325 | 8/1998 |
| WO | WO9745847 | 12/1997 | WO | WO9834326 | 8/1998 |
| WO | WO9745848 | 12/1997 | WO | WO9834327 | 8/1998 |
| WO | WO9745906 | 12/1997 | WO | WO9834328 | 8/1998 |
| WO | WO9745907 | 12/1997 | WO | WO9834329 | 8/1998 |
| WO | WO9745912 | 12/1997 | WO | WO9834330 | 8/1998 |
| WO | WO9745914 | 12/1997 | WO | WO9834331 | 8/1998 |
| WO | WO9745915 | 12/1997 | WO | WO 98/40627 | 9/1998 |
| WO | WO9745916 | 12/1997 | WO | WO 98/43336 | 10/1998 |
| WO | WO9745918 | 12/1997 | WO | WO9917309 | 4/1999 |
| WO | WO9745919 | 12/1997 | WO | WO9917311 | 4/1999 |
| WO | WO9745920 | 12/1997 | WO | WO9917312 | 4/1999 |
| WO | WO9745921 | 12/1997 | WO | WO9917313 | 4/1999 |
| WO | WO9745922 | 12/1997 | WO | WO9917314 | 4/1999 |
| WO | WO9745923 | 12/1997 | WO | WO9917315 | 4/1999 |
| WO | WO9745924 | 12/1997 | WO | WO9917316 | 4/1999 |
| WO | WO9745925 | 12/1997 | WO | WO9917422 | 4/1999 |
| WO | WO9745926 | 12/1997 | WO | WO9917424 | 4/1999 |
| WO | WO9745927 | 12/1997 | WO | WO9917425 | 4/1999 |
| WO | WO9745928 | 12/1997 | WO | WO9917426 | 4/1999 |

| | | |
|---|---|---|
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 5/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

High Voltage Cables in a New Class of Generators Powerformer: M. Leijon et al: Jun. 14, 1999; pp1–8.

Ohne Tranformator direkt ins Netz; Owman et al. ABB. A6: Feb. 8, 1999: pp48–51.

Submersible Motors and Wet–Rotor Motors for Centrifugal Pumps Submerged in the Fluid Handled: K.. Bienick, KSB: Feb. 25, 1988: pp9–17.

High Voltage Generators: G. Beschastnov et al: 1977: vol. 48. No. 6 pp1–7.

Eine neue Type von Unterwassermotoren; Electrotechnik und Maschinenbam. 49: Aug. 1931; pp2–8.

Problems in design of the 110–5OokV high–voltage generators: Nikiti et al: World Electrotechnical Congress: Jun. 21–27, 1977: Section 1. Paper #16.

Manufacture and Testing of Roebel bars: P. Marti et al: 1960. Pub.86. vol. 8. pp 25–31.

Hydroalternators of 110 to 220 kV Elektrotechn. Obz.. vol. 64, No. 3, pp132–136 Mar. 1975: A. Abramov.

Design Concepts for an Amorphous Metal Distribution Transformer; E. Boyd et al; IEEE Nov. 1984.

Neue Wege zum Bau zweipoliger Turbogeneratoren bis 2 GVA, 6OkV Elektrotechnik und Maschinenbau Wien Janner 1972. Heft 1, Seite 1–11; G. Aichholzer.

Optimizing designs of water–resistant magnet wire; V. Kuzenev et al; Elektrotekhnika, vol. 59. No. 12. pp35–40, 1988.

Zur Entwicklung der Tauchpumpenmotoren; A. Schanz; KSB. pp19–24.

Direct Generation of alternating current at high voltages; R. Parsons; IEEE Journal, vol. 67 #393, Jan. 15, 1929: pp1065–1080.

Stopfbachslose Umwalzpumpen—ein wichtiges Element im modernen Kraftwerkbau; H. Holz. KSB 1, pp13–19, 1960.

Zur Geschichte der Brown Boven Synchron–Maschinen; Viezig Jahre Generatorbau; Jan–Feb. 1931 pp 15–39.

Technik und Anwendung moderner Tauchpumpen: A. Heumann; 1987.

High capacity synchronous generator having no tooth stator: V.S. Kildishev et al; No. 1, 1977 pp11–16.

Der Asynchronmotor als Antrieb stopfocichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable;Ichihara et al; Aug. 1992: pp3–6.

Underground Transmission Systems Reference Book: 1992:pp16–19; pp36–45: pp67–81.

Power System Stability and Control; P. Kundur. 1994; pp23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis: R. Schiferl et al: Aug. 1983; pp2685–2693.

Reactive Power Compensation; T. Petersson: 1993; pp 1–23.

Permanent Magnet Machines: K. Binns: 1987: pp 9–1 through 9–26.

Hochspannungsaniagen for Wechselstrom: 97. Hochspannungsaufgaben an Generatoren und Motoren: Roth et al: 1938; pp452–455.

Hochspannungsaniagen for Wechselstrom: 97. Hochspannungsaufgaben an Generatoren und Motoren: Roth et al: Spring 1959. pp30–33.

Neue Lbsungwege zum Entwurf grosser Turbogeneratoren bis 2GVA, 6OkV; G. Aicholzer; Sep. 1974, pp249–255.

Advanced Turbine–generators– an assessment; A. Appleton, et al: International Conf. Proceedings. Lg HV Elec. Sys. Paris. FR. Aug.–Sep. 1976. vol. I. Section 11–02. pg1–9.

Fully slotless turbogenerators: E. Spooner; Proc., IEEE vol. 120 #12. Dec. 1973.

Toroidal winding geometry for high voltage superconducting alternators: J. Kinley et al: MIT—Elec. Power Sys. Engrg. Lab for IEEE PES:Feb. 1974.

High–Voltage Stator Winding Development: D. Albright et al: Proj. Report EL339. Project 1716, Apr. 1984.

POWERFORMER™: A giant step in power plant engineering; Owman et al: CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable: Jan. 1992.

Transformer core losses: B. Richardson: Proc. IEEE May 1986. pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elekrotechnika*, 1970, pp 6–8.

J&P Transformer Book 11$^{th}$ Edition;A. C. Franklin et al; owned by Butterworth–Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77kV–Class High Tc Superconducting Power Cable; T. Shimonosono et al; *IEEE Power Delivery*, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A Felldin; *ERA* (TEKNIK) Aug. 1994; pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems– new concepts and applications; E. Wirth et al; ABB Review Apr. 1997, p 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. 1, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering, second edition 1995 ISBN 0-07-462286-2, Chapter 5, pp91-98.

Performance Characteristics of a Wide Range Induction Type Frequency Converter; G.A. Ghoneem; Ieema Journal, Sep. 1995; pp 21-34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1-65.

Design and manufacture of a large superconducting homopolar motor; A.D. Appleton; IEEE Transactions on Magnetics, vol. 19, No. 3, Part 2, May 1983, pp 1048-1050.

Application of high temperature superconductivy to electric motor design; J.S. Edmonds et al; IEEE Transactions on Energy Conversion Jun. 1992, No. 2, pp 322-329.

Power Electronics and Variable Frequency Drives; B. Birnal; IEEE industrial Electronics—Technology and Applications, 1996, pp. 356.

Properties of High Plymer Cement Mortar; M.Tamai et al; *Science & Technology in Japan, No. 63* ; 1977, pp 6-14.

Weatherability of Polymer-Modified Mortars after Ten-Year Outdoor Exposure in Koriyama and Sapporo; Y. Ohama et al; *Science & Technology in Japan No. 63*; 1977, pp 26-31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882-1888.

Low-intensy laser-triggering of rail-gaps with magnesium-aerosol switching-gases; W. Frey; 11th International Pulse Power Conference, 1997, Baltimore, USA Digest of Technical Papers, p. 322-327.

P. Marti and R. Schuler, "Manufacturing and Testing of Roebel Bars".

M. Ichihara and F. Fukasawa, "An EHV Bulk Power Transmission Line Made with Low Loss XLPE Cable," Aug. 1992, *Hitachi Cable Review*, No. 11, pp. 3-6.

*Underground Transmission Systems Reference Book*, 1992 Edition, prepared by Power Technologies, Inc. for Electric Power Research Institute (title page).

P. Kundur, "Power System Stability and Control," *Electric Power Research Institute Power System Engineering Series*, McGraw-Hill, Inc.

R. F. Schiferl and C. M. Ong, "Six Phase Synchronous Machine with AC and DC Stator Connections, Part II: Harmonic Studies and a Proposed Uninterruptible Power Supply Scheme", *IEEE Transactions on Power Apparatus and Systems*,vol. PAS-102, No. 8, Aug. 1983, pp. 2694-2701.

R. F. Schiferl and C. M. Ong, "Six Phase Synchronous Machine with AC and DC Stator Connections, Part I: Equivalent Circuit Representation and Steady-State Analysis", *IEEE Transactions on Power Apparatus and Systems*, vol. PAS-102, No. 8, Aug. 1983, pp. 2685-2693.

T. Petersson, *Reactive Power Compensation*, Abb Power Systems AB, Dec. 1993.

"Different types of Permanent Magnet Rotors", a summary by ABB Corporate Research, Nov. 1997.

K. Binns, Permanent Magnet Machines, *Handbook of Electric Machines*, Chapter 9, McGraw Hill, 1987, pp. 9-1-9-25.

* cited by examiner

NOTES:
A = High resistans grounding when Z is resistive
B = Resonant grounding when Z is inductive

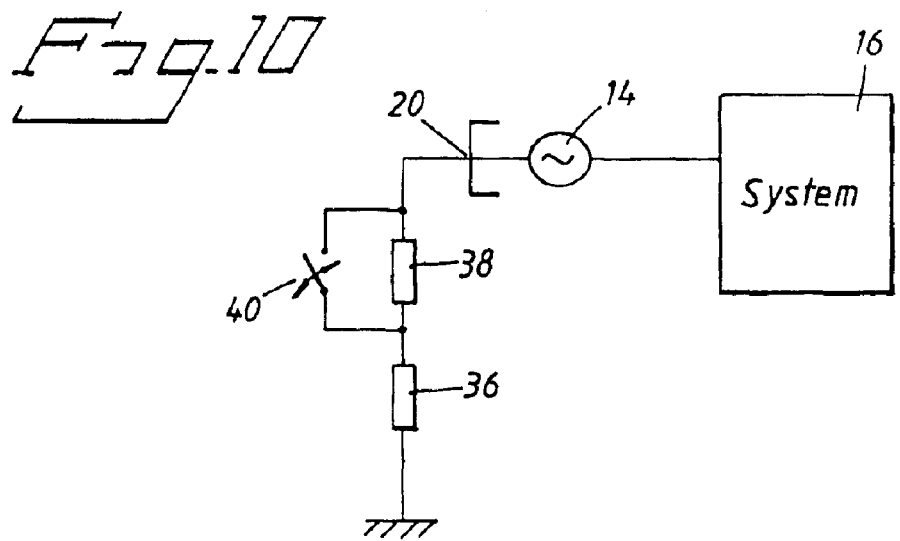
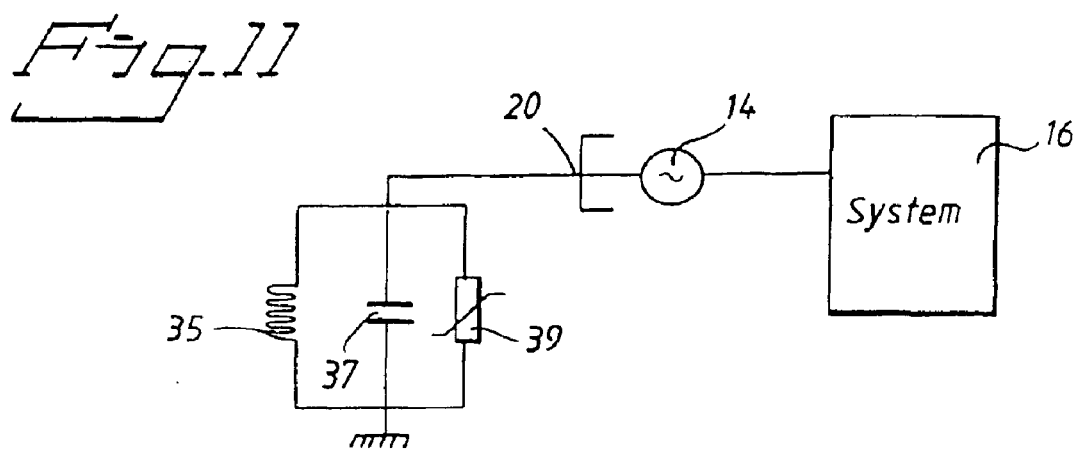
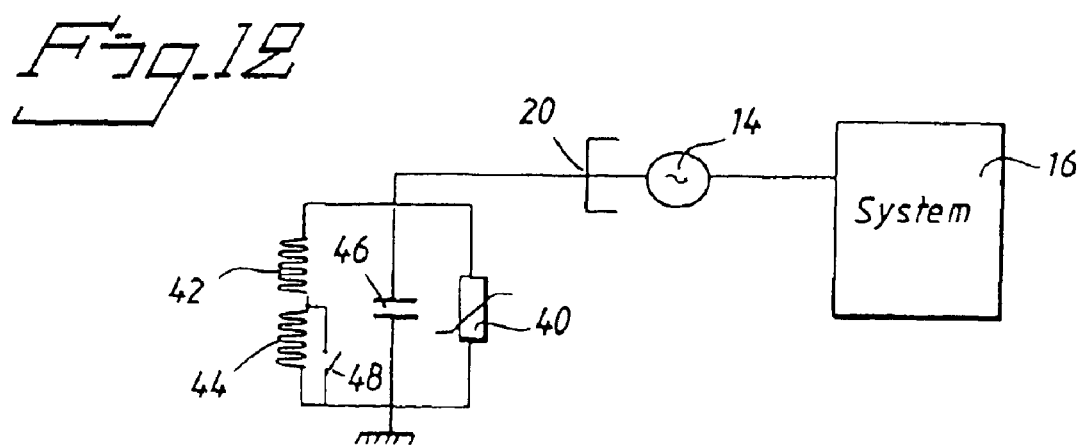

HIGH VOLTAGE AC MACHINE WINDING WITH GROUNDED NEUTRAL CIRCUIT

The present invention relates to an electric high voltage AC machine intended to be directly connected to a distribution or transmission network, said machine comprising at least one winding.

Such generators with a rated voltage of up to 36 kV is described by Paul R. Siedler, "36 kV Generators Arise from Insulation Research", Electrical World, Oct. 15, 1932, pp. 524–527. These generators comprise windings formed of medium voltage insulated conductors wherein insulation is subdivided into various layers of different dielectric constants. The insulating material used is formed of various combinations of the three components of micafolium-mica, varnish and paper.

In a publication by Power Research Institute, EPRI, EL-3391, Apr. 1984 a generator concept is proposed for providing such high voltages that the generator can be directly connected to a power network without any intermediate transformer. Such a generator was supposed to comprise a superconducting rotor. The magnetization capacity of the superconducting field would then make it possible to use air gap windings of sufficient thickness for withstanding the electric forces. The proposed rotor is, however, of a complicated structure with a very thick insulation which considerably increases the size of the machine. In addition thereto special measures have to be taken for insulating and cooling the coil end sections.

By electric high voltage AC machines is meant, according to the present invention, rotating electric machines like generators in power stations for production of electric power, double-fed machines, outer pole machines, synchronous machines, asynchronous converter cascades, as well as power transformers. For connecting such machines, except for transformers, to distribution and transmission networks, in the following commonly referred to as power networks, a transformer has so far been needed for transforming the voltage up to the network level, that is in the range of 130–400 kV.

By manufacturing the winding of these machines of an insulated electric high voltage conductor with a solid insulation of similar structure as cables used for power transmission the voltage of the machine can be increased to such levels that the machines can be directly connected to any power network without an intermediate transformer. Thus this transformer can be omitted. Typical working range for these machines is 30–800 kV.

For this kind of machines special attention has to be paid to grounding problems.

Grounding of generator systems and other similar electrical systems implies intentional measures for connecting an electric system to ground potential. When the so-called neutral point of the system is available it is often connected to ground, directly or through a suitable impedance. It also happens that other points in the system are connected to ground. If one point in the system is grounded the complete system is grounded as long as the galvanic connection extends.

The grounding principle used is determined by the design of the system. For a system including a generator directly connected to a Y-Δ connected step-up-transformer with the Δ-winding at the generator voltage the following grounding alternatives are most common.

High resistance grounding
No grounding
Resonant grounding.

High resistance grounding is normally realized by connection of a low ohmic resistor in the secondary of a distribution transformer with the primary winding of the transformer connected from the generator neutral point to ground. Such prior art grounding is illustrated in FIG. 1, which shows a generator 2 connected by a Y-Δ connected step-up transformer 3 to a network 9. The primary 11 of a distribution transformer is connected between the neutral point of the generator 2 and ground. In the secondary 10 of the transformer a resistor 12 is connected.

The same kind of grounding can, of course, be obtained by installing a high ohmic resistor directly between the generator neutral point and ground.

An ungrounded electric system lacks any intentional connection to ground. Thus an ungrounded generator has no connection between its neutral point and ground, except for possible voltage transformers for feeding different relays and instruments.

Resonant grounding is normally also realized as illustrated in FIG. 1 with the resistor 12 replaced by a reactor 12a. The reactor reactance is chosen such that the capacitive current during a line to ground fault is neutralized by an equal component of inductive current contributed for by the reactor 12a.

Also low resistance or low impedance grounding and effective grounding of the above systems are possible. Low resistance or low impedance grounding will result in lower transient overvoltages but higher ground fault currents, which can cause internal damages to the machine.

Low resistance grounding is achieved by the intentional insertion of a resistance between the generator neutral and ground. The resistance may be inserted either directly in connection to ground or indirectly, in the secondary of a transformer whose primary is connected between generator neutral and ground, cf. FIG. 1.

Low impedance grounding, that is low inductance grounding is accomplished in the same way as low resistance grounding with the substitution of an inductor for the resistor. The value of the inductor in ohms is less than that required for resonant grounding, as discussed above.

For systems comprising several generators connected to a common feeding line or bus with circuit breakers between the generator terminals and the common bus low resistance or low impedance grounding is suitable.

Effectively grounding the neutral of a generator has substantially the same advantages and disadvantages as the low resistance or low impedance grounding with some differences.

A system is said to be effectively grounded if certain impedance requirements, which restricts the size of the grounding impedance, are fulfilled. In an effectively grounded system the maximum phase-to-ground voltage in unfaulted phases, in case of a ground fault, are limited to 80% of phase-to-phase voltage.

A power system network is mainly grounded through ground connections of neutral points of transformers in the system and can include no impedance (except for contact resistances), so-called direct grounding, or have a certain impedance.

Previously known grounding techniques are described in e.g. the publication IEEE C62.92-1989, IEEE Guide for the Application of Neutral Grounding in Electrical Utility Systems, Part II—Grounding of Synchronous Systems, published by the Institute of Electrical and Electronics Engineers, New York, USA, Sep. 1989.

If the generator neutral is grounded through a low resistance or inductance as discussed above, a path is formed for third harmonic currents from the generator neutral to ground. If a directly grounded or low-impedance grounded transformer winding or another low-impedance grounded generator is directly connected to the generator, the third harmonic currents will circulate therebetween under normal conditions.

Techniques for solving the problems of third harmonic currents in generator-and motor-operation of AC electric machines of the kind to which the present invention relates are described in Sweedish patent application Ser. Nos. 9602078-9 and 97003-9.

The purpose of the present invention is to provide an electric high voltage AC machine suitable for direct connection to distribution or transmission networks as indicated above, which machine is provided with grounding means suitable for different uses and operating conditions of the machine.

This purpose is obtained with an electric high voltage AC machine of the kind defined in the introductory portion of the description and having the characterising features of at least one winding comprising at least one current-carrying conductor and a magnetically permeable, electric field confining covering surrounding the conductor; a first layer having semi-conducting properties surrounding the conductor, a solid insulating layer surrounding said first layer, and an outer layer having semi-conducting properties surrounding said insulating layer, and grounding means for connecting the neutral paint of said winding in circuit to ground.

An important advantage of the machine according to the invention resides in the fact that the electric field is nearly equal to zero in the end region of the windings outside the second layer with semiconducting properties. Thus no electric fields need to be controlled outside the winding and no field concentrations can be formed, neither within the sheet, nor in winding end regions, nor in transitions therebetween.

According to an advantageous embodiment of the machine according to the invention at least two adjacent layers have substantially equal thermal expansion coefficients. In this way defects, cracks or the like as a result of thermal motions in the winding, are avoided.

According to another advantageous embodiment of the machine according to the invention said grounding means comprise means for low resistance grounding of the winding. In this way transient overvoltages as well as the ground fault current can be limited to moderate values.

According to still another advantageous embodiment of the machine according to the invention, wherein the machine has a Y-connected winding, the neutral point of which being available, high resistance grounding means comprise a resistor connected in the secondary of a transformer whose primary is connected between the neutral point and ground. In this way the resistor used in the secondary of the transformer is of comparatively low ohmic value and of rugged construction. Sufficient damping to reduce transient overvoltages to safe levels can be achieved with a properly sized resistor. Further, mechanical stresses and fault damages are limited during line-to-ground faults by the restriction of the fault current. Such a grounding device is also more economical than direct insertion of a high ohmic resistor between the generator neutral and ground.

According to another advantageous embodiment of the machine according to the invention, wherein the machine has a Y-connected winding the neutral point of which being available, the grounding means comprises a reactor connected in the secondary of a transformer whose primary is connected between the neutral point and ground, said reactor having characteristics such that the capacitive current during a ground fault is substantially neutralized by an equal component of inductive current contributed for by the reactor. In this way the net fault current is reduced to a low value by the parallel resonant circuit thus formed, and the current is essentially in phase with the fault voltage. The voltage recovery on the faulted phase is very slow in this case and accordingly any ground fault of a transient nature will automatically be extinguished in a resonant grounded system.

According to still other advantageous embodiments of the machine according to the invention the grounding means comprise a Y-Δ grounding transformer or a so-called zigzag grounding transformer connected to the network side of the machine. The use of such grounding transformers are equivalent to low inductance or low resistance grounding with respect to fault current levels and transient overvoltages.

Figure 2:
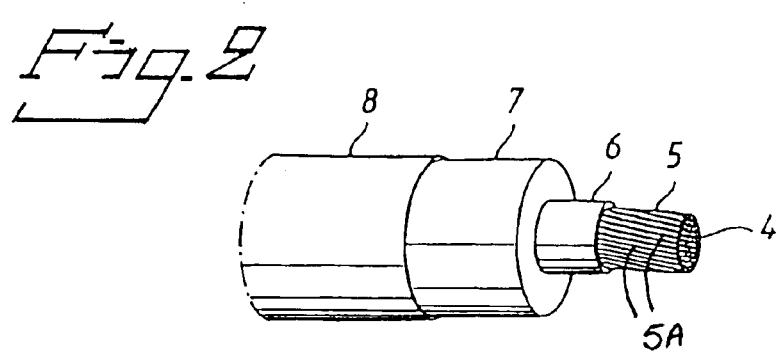
Figure 3:
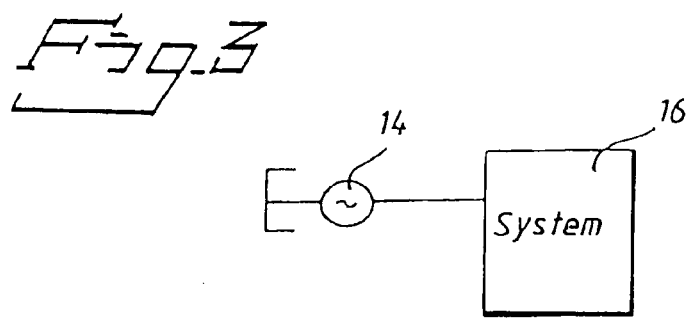
Figure 13:
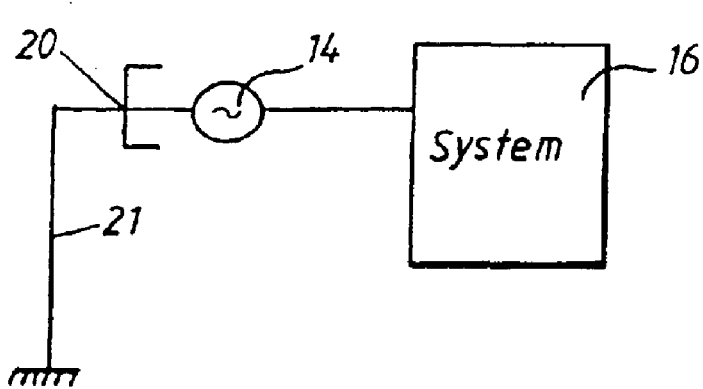
Figure 14:
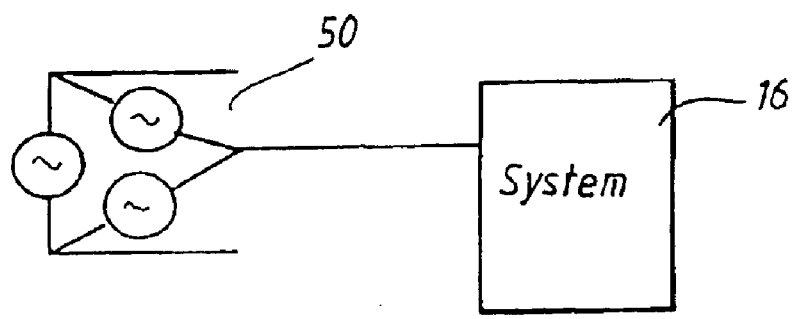
Figure 15:
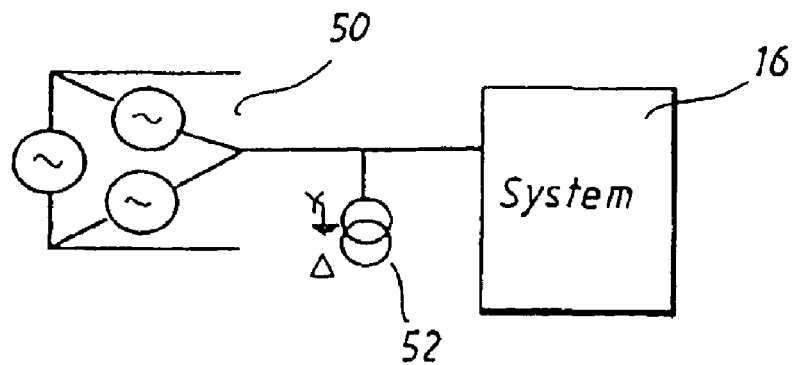

To explain the invention in more detail embodiments of the machine according to the invention, chosen as examples, will now be described more in detail with reference to FIG. 2-11 on the accompanying drawings on which FIG. 1 illustrates prior art grounding of a synchronous generator, FIG. 2 shows an example of the insulated conductor used in the windings of the machine according to the invention, FIG. 3 shows an ungrounded three-phase machine in the form of a Y-connected generator or motor connected to a power system, FIGS. 4–13 show different examples of grounding the Y-connected machine in FIG. 3, FIG. 14 shows a machine according to the invention in the form of a Δ-connected generator or motor connected to a power system, and FIG. 15 illustrates the use of a grounding transformer in the system shown in FIG. 14.

In FIG. 2 an example is shown of an insulated conductor, which can be used in the windings of the machine according to the invention. Such an insulated conductor comprises at least one conductor 4 composed of a number of non-insulated and insulated strands 5. Around the conductor 4 there is an inner semiconducting layer 6, which is in contact with at least some of the non-insulated strands 5A. This semiconducting layer 6 is in its turn surrounded by the main insulation of the cable in the form of an extruded solid insulating layer 7. The insulating layer is surrounded by an external semiconducting layer 8. The conductor area of the cable can vary between 80 and 3000 $mm^2$ and the external diameter of the cable between 20 and 250 mm.

FIG. 3 shows schematically an ungrounded electric high voltage AC machine in the form of a Y-connected generator or motor 14 directly connected to a power system 16.

Figure 4:
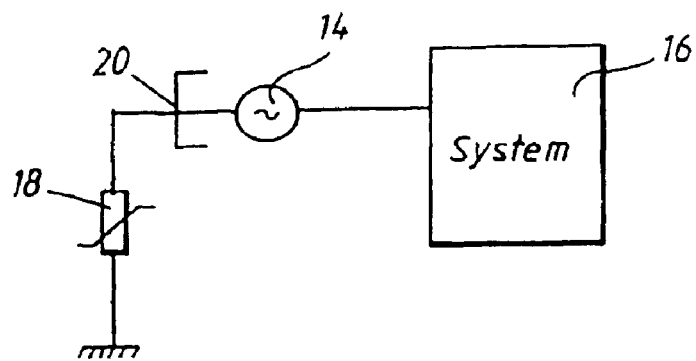

FIG. 4 shows grounding means in the form of an overvoltage protector, like a non-linear resistance arrester 18, connected between the neutral point 20 of the Y-connected machine 14 and ground. Such a non-linear resistance arrester 18 connected to the neutral point protects the insulated conductor used in the machine windings against transient overvoltages, such as overvoltages caused by a stroke of lightning.

Figure 5:
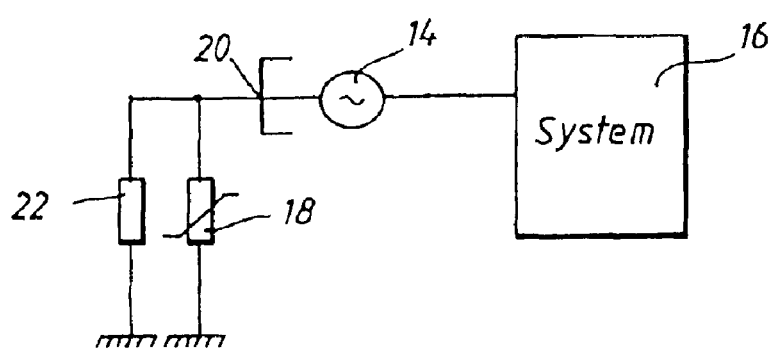

FIG. 5 shows an embodiment with a high ohmic resistor 22 connected in parallel to the non-linear resistance arrester 18. The non-linear resistance arrester 18 is functioning in the same way in this embodiment as in the embodiment shown in FIG. 4 and with the resistor 22 a sensitive detection of ground faults by measuring the voltage across the resistor 22 is realised.

Figure 6:
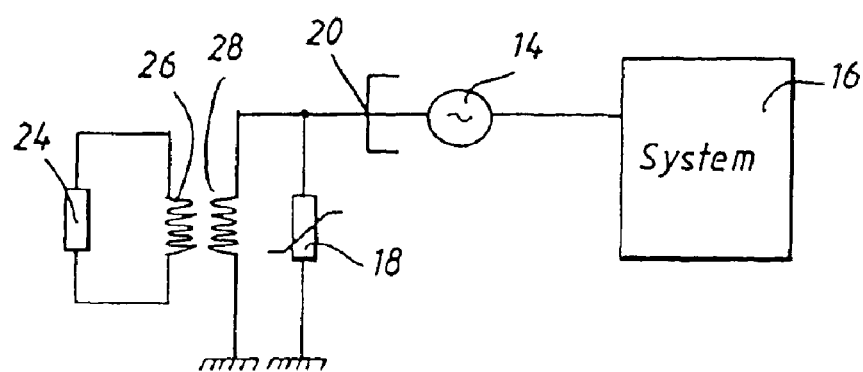

FIG. 6 shows an embodiment with high resistance grounding of the neutral point 20. In this embodiment a technique similar to the prior art described in connection with FIG. 1 is used. Thus a resistor 24 is connected to the secondary 26 of a transformer with the primary winding 28 of the transformer connected from the neutral point 20 of the machine 14 to ground. The resistor 24 is comparatively low ohmic and of rugged construction, as compared to a high ohmic resistor which would be needed for direct connection between the neutral point 20 and ground for obtaining the same result. The voltage class of the resistor can consequently be reduced. Also in this case a non-linear resistance arrester 18 is connected in parallel to the primary winding 28. With this embodiment mechanical stresses and fault damages are limited during line-to-ground faults by restricting the fault current. Transient overvoltages are limited to safe levels and the grounding device is more economical than direct insertion of a resistor.

Resonant grounding of the machine can be realised in a similar way by replacing the resistor 24 by a reactor having characteristics such that the capacitive current during a line-to-ground fault is neutralized by an equal component of inductive current contributed for by the reactor. Thus the net fault current is reduced by the parallel resonant circuit thus formed and the current will be essentially in phase with the fault voltage. After extinction of the fault the voltage recovery on the faulted phase will be very slow and determined by the ratio of inductive reactance to the effective resistance of the transformer/reactor combination. Accordingly any ground fault of transient nature will automatically be extinguished in such a resonant grounded system. Thus such resonant grounding means limits the ground fault current to practically zero, thus minimising the mechanical stresses Further continued operation of the machine can be permitted after the occurrence of a phase-to-ground fault until an orderly shutdown can be arranged.

Figure 7:
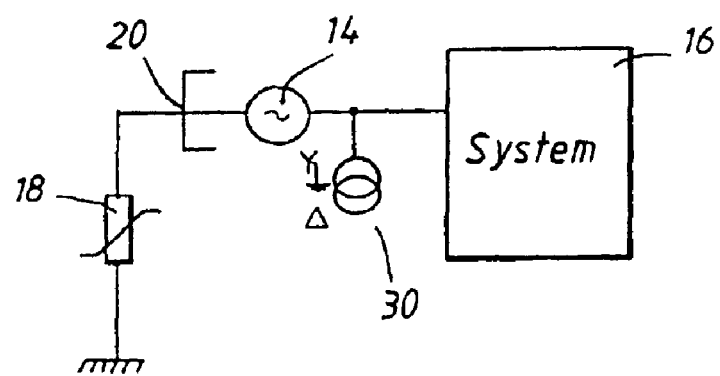

FIG. 7 shows an embodiment with a non-linear resistance arrester 18 connected between the neutral point 20 and ground and a grounding transformer 30 connected on the network side of the machine 14. The grounding transformer 30 is of Y-Δ design with the neutral point of the Y-connection connected to ground, whereas the Δ-winding is isolated. Grounding transformers are normally used in systems which are ungrounded or which have a high impedance ground connection. As a system component the grounding transformer carries no load and does not affect the normal system behaviour. When unbalances occur the grounding transformer provides a low impedance in the zero sequence network. The grounding transformer is in this way equivalent to a low inductance or low resistance grounding with respect to fault current levels and transient overvoltages.

The grounding transformer can also be a so-called zigzag transformer with special winding arrangements, see e.g. Paul M. Anderson, "Analysis of Faulted Power Systems", The Iowa State University Press/Ames, 1983, pp. 255–257.

Also a possible auxiliary power transformer can be used for such grounding purposes.

Figure 8:
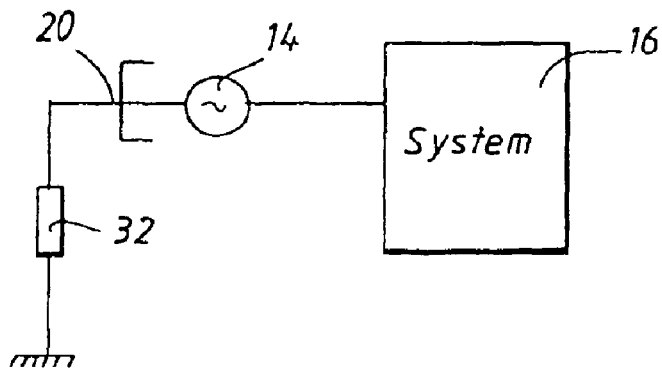

FIG. 8 shows an embodiment with a low ohmic resistor 32 connected between the neutral point 20 of the machine 14 and ground. The main advantage of such a low resistance grounding is the ability to limit transient and temporary overvoltages. The currents will, however, be higher in case of single phase ground faults. Also third harmonic currents will be higher in undisturbed operation.

Figure 9:
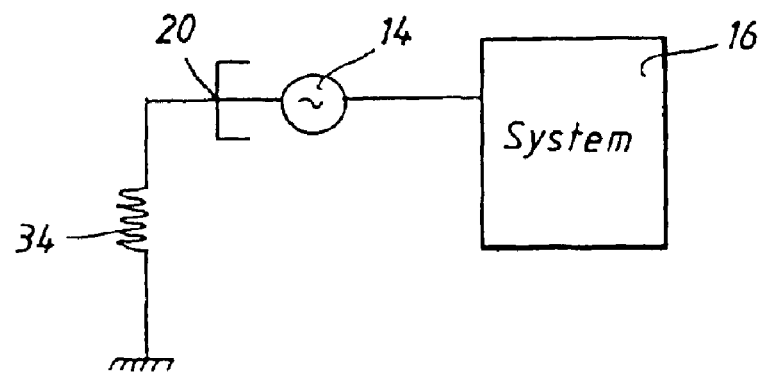

FIG. 9 shows an alternative embodiment of the machine according to the invention in which the resistor 32 is replaced by a low inductance inductor 34 connected between the neutral point 20 and ground. Low inductance grounding works essentially in the same way as low ohmic grounding. The value of the inductor 34 in ohms is less than that required for resonant grounding, cf. description of FIG. 6.

As an alternative to the direct connection between the neutral point 20 and ground of the resistor 32 or the inductor 34, they may be indirectly connected with the aid of a transformer whose primary is connected between the neutral point 20 and ground and whose secondary contains the resistor or inductor, cf. the description of FIG. 6.

In FIG. 10 an embodiment is shown comprising two impedances 36 and 38 connected in series between the neutral point 20 of the machine 14 and ground, the impedance 36 having a low impedance value and the impedance 38 a high impedance value. The impedance 38 can be short-circuited by a short-circuiting device 40. In normal operation the short-circuiting device 40 is open in order to minimize third harmonic currents. In case of a ground fault the short-circuiting device 40 is controlled to short-circuit the impedance 38 and the potential in the neutral point 20 will be low and the current to ground comparatively high.

In case of an internal ground fault in the machine 14 the impedance 38 is not short-circuited. As a consequence the voltage will be high in the neutral point 20 but the current to ground will be limited. In such a situation this is to prefer since a high current can give rise to damages in this case.

To be able to cope with the problems arising from third harmonics when directly connecting an AC electric machine to a three-phase power network, i.e. when no step-up transformer is used between the machine and the network, grounding means in the form of a suppression filter 35, 37, tuned to the third harmonic together with an overvoltage protector 39 can be used, see FIG. 11. The filter thus comprises a parallel resonance circuit consisting of an inductor 35 and a capacitive reactance 37. The dimensioning of the filter 35, 37 and its overvoltage protector 39 is such that the parallel circuit is capable of absorbing third harmonics from the machine 14 during normal operation, yet limiting transient and temporary overvoltages. In case of a fault the overvoltage protector 39 will limit the fault voltage such that the fault current flows through the overvoltage protector 39 if the fault is considerable. In case of a single-phase ground fault the currents will be higher as compared to e.g. the case of high resistance grounding since the fundamental impedance is low.

In FIG. 12 an embodiment is shown wherein the grounding means comprises a detuned switchable third harmonics depression filter connected in parallel to an overvoltage protector 40. Such filters can be realised in several different ways. FIG. 12 shows an example comprising two inductors 42, 44 connected in series and a capacitor 46 connected in parallel to the series-connected inductors 42, 44. Further a short-circuiting device 48 is connected across the inductor 44.

The short-circuiting device 48 is controllable to change the characteristic of the filter by short-circuiting the inductor 44 when a risk for third harmonic resonance between the filter and the machine 14 and network 16 is detected. This is described more in detail in Swedish patent application 9700347-9. In this way third harmonic currents are strongly limited in normal operation. Transient and temporary overvoltages will be limited and the currents will be higher in case of a single-phase ground fault in the same way as described in connection with FIG. 11.

FIG. 13 shows an embodiment wherein the neutral point 20 of the machine 14 is directly connected to ground, at 21.

Such direct grounding limits transient and temporary overvoltages but results in high currents in case of ground faults. Third harmonic current flow from the neutral 20 of the machine to ground will be comparatively high in normal operation.

As a further alternative the grounding means of the machine according to the invention can comprise an active circuit for providing a connection of the neutral point to ground having desirable impedance properties.

In FIG. 14 a Δ-connected three-phase machine 50 is shown directly connected to the distribution or transmission network 16.

In such a situation a grounding transformer of the same kind as the one used in the embodiment shown in FIG. 7 can be connected on the network side of the machine 50.

As in the embodiment of FIG. 7 the grounding transformer can be a Y-Δ-connected transformer with the neutral point of the Y-connection ground, or a so called zigzag grounding transformer, that is a Z-0-connected transformer with the Z grounded. The grounding transformer will limit temporary overvoltages.

As in the embodiment of FIG. 7 a possible auxiliary power transformer can also be used for this purpose.

What is claimed is:

1. An electric high voltage AC machine for direct connection to a distribution or transmission network, said machine including at least one flexible winding and having a neutral point and comprising at least one current-carrying conductor comprising a plurality of insulated strands and at least one uninsulated strand and a magnetically permeable, electric field confining covering surrounding the conductor; a first layer having semi-conducting properties surrounding the conductor and being in electrical contact therewith, a solid insulating layer surrounding said first layer, and an outer layer having semi-conducting properties surrounding said insulating layer, and grounding means for connecting the neutral point of said winding to ground.

2. The machine according to claim 1, wherein the potential of said first layer is substantially equal to the potential of the conductor.

3. The machine according to claim 1, wherein the potential of said first layer is substantially equal to the potential of the conductor.

4. The machine according to claim 3, wherein said second layer is connected to a predetermined potential.

5. The machine according to claim 4, wherein said predetermined potential is ground potential.

6. The machine according to claim 1, wherein at least two adjacent layers have substantially equal thermal expansion coefficients.

7. The machine according to claim 1, wherein said layers are adjacent to each other, an each of said layers has at least one connecting surface each being fixedly connected to the connecting surface of the adjacent layer along substantially the whole of said connecting surface.

8. The machine according to claim 1, wherein said grounding means comprise means for low-resistance grounding of the winding.

9. The machine according to claim 8, said machine having a Y-connected winding neutral point and wherein said low-resistance grounding means comprise a low-resistance resistor connected between the neutral point and ground.

10. The machine according to claim 8, said machine having a Y-connected winding the neutral point further comprising a transformer having a primary and a secondary winding and wherein said low-resistance grounding means comprises a resistor connected in the secondary of the transformer whose primary is connected between the neutral point and ground.

11. The machine according to claim 1, wherein said grounding means comprise means for low-inductance grounding of the winding.

12. The machine according to claim 11, said machine having a Y-connected winding the neutral point and wherein said low-inductance grounding means comprises a low-inductance inductor connected between the neutral point and ground.

13. The machine according to claim 11, said machine having a Y-connected winding neutral point, further comprising a transformer having a primary and a secondary winding and wherein said low-inductance grounding means comprises an inductor connected in the secondary of the transformer whose primary is connected between the neutral point and ground.

14. The machine according to claim 1, wherein said grounding means comprise means for high-resistance grounding of the winding.

15. The machine according to claim 14, said machine having a Y-connected winding neutral point and wherein said high-resistance grounding means comprise a high-resistance resistor connected between the neutral point and ground.

16. The machine according to claim 14, said machine having a Y-connected winding neutral point further comprising a transformer having a primary and a secondary winding and wherein said high-resistance grounding means comprise a resistor connected in the secondary of the transformer whose primary is connected between the neutral point and ground.

17. The machine according to claim 1, wherein said grounding means comprise means for high-inductance grounding of the winding.

18. The machine according to claim 17, said machine having a Y-connected winding the neutral point and wherein said high-inductance grounding means comprises a high-inductance inductor connected between the neutral point and ground.

19. The machine according to claim 17, said machine having a Y-connected winding neutral point further comprising a transformer having a primary and a secondary winding and wherein said high-inductance grounding means comprises an inductor connected in the secondary of the transformer whose primary is connected between the neutral point and ground.

20. The machine according to claim 1, said machine having a Y-connected winding neutral point, further comprising a transformer having a primary and a secondary winding and wherein said grounding means comprises a reactor connected in the secondary of the transformer whose primary is connected between the neutral point and ground, said reactor having characteristics such that capacitive current during a ground fault is substantially neutralized by an equal component of inductive current contributed for by the reactor.

21. The machine according to claim 1, wherein said grounding means comprises means for changing the impedance of the connection to ground in response to a ground fault.

22. The machine according to claim 1, wherein said grounding means comprises an active circuit.

23. The machine according to claim 1, wherein said grounding means comprises a Y-Δgrounding transformer connected to the network side of the machine.

24. The machine according to claim 1, wherein said grounding means comprise a zigzag grounding transformer connected to the network side of the machine.

25. The machine according to claim 1, said machine having a Y-connected winding neutral point wherein said grounding means comprise a suppression filter tuned for the n:th harmonic.

26. The machine according to claim 1, said machine having a Y-connected winding neutral point wherein said grounding means comprise a switchable suppression filter detuned for the n:th harmonic.

27. The machine according to claim 25, wherein said n:th harmonic is the third harmonic.

28. The machine according to claim 1, said machine having a Y-connected winding neutral point wherein said grounding means comprise an overvoltage protector connected between said neutral point and ground.

29. The machine according to claim 1, said machine having a Y-connected winding neutral point wherein an overvoltage protector is connected between said neutral point and ground in parallel to said grounding means.

30. A distribution or transmission network, which comprises at least one machine according to claim 1.

31. An electric AC machine having a magnetic circuit for high voltage comprising:

a magnetic core and at least one winding, wherein said winding is formed of a flexible cable comprising at least one current-carrying conductor and a magnetically permeable, electric field confining covering surrounding the conductor, each conductor having a number of insulated conductor elements and at least one uninsulated conductor element, and inner semi-conducting layer surrounding the conductor and being in electric contact with at least one of the conductor elements, an insulating layer of solid insulating material surrounding said inner semi-conducting layer, and an outer semi-conducting layer surrounding said insulating layer, and grounding means for connection to at least one selected point of said winding to ground.

32. The machine according to claim 31, wherein said grounding means comprise means for direct grounding of the winding.

33. A high voltage electric machine comprising at least one winding, wherein said winding comprises a flexible cable including at least one current-carrying conductor comprising a plurality of insulated strands and at least one uninsulated strand, and a magnetically permeable, electric field confining covering surrounding the conductor including an inner semi-conducting layer surrounding the conductor and being in electrical contact therewith, a solid insulating layer surrounding the inner layer, and an outer semi-conducting layer surrounding the insulating layer, said inner and outer layers forming equipotential surfaces around the conductor, said cable forming at least one uninterrupted turn in the corresponding winding of said machine.

34. The machine of claim 33, wherein the cover is formed of a plurality of layers including an insulating layer and wherein said plurality of layers are substantially void free.

35. The machine of claim 33, wherein the cover is an electrical contact with the conductor.

36. The machine of claim 35, wherein the layers of the cover have substantially the same temperature coefficient of expansion.

37. The machine of claim 33, wherein the cover is heat resistant such that the machine is operable of 100% overload for two hours.

38. The machine of claim 33, wherein the machine, when energized, produces an electric field and the cover confines the electric field so that the cable is operable free of sensible end winding loss.

39. The machine of claim 33, wherein the machine, when energized, produces an electric field and the cover confined the electric field so that the winding is operable free of partial discharge and field control.

40. The machine of claim 33, wherein the winding comprises multiple uninterrupted turns.

41. The machine of claim 33, wherein the cable comprises a transmission line.

* * * * *